United States Patent [19]

Schroeder

[11] Patent Number: 4,995,734
[45] Date of Patent: Feb. 26, 1991

[54] PILLOW BLOCK HOUSING FOR A SHAFT-SUPPORTING BEARING
[75] Inventor: Robert Schroeder, Rockford, Ill.
[73] Assignee: Pacific Bearing Co., Rockford, Ill.
[21] Appl. No.: 505,829
[22] Filed: Apr. 6, 1990
[51] Int. Cl.⁵ .................. F16C 23/04; F16C 29/12
[52] U.S. Cl. ............................ 384/38; 384/29; 384/43; 384/57
[58] Field of Search .............. 384/10, 26, 29, 37, 384/38, 43, 49, 57

[56] References Cited
U.S. PATENT DOCUMENTS 3,333,513  8/1967  Wettstein ..................... 384/29 X
3,876,264  4/1975  McCloskey ..................... 384/43
3,893,732  7/1975  McCloskey ..................... 384/43
3,907,384  9/1975  McCloskey ..................... 384/43
4,005,913  2/1977  Thomson, Jr. ................... 384/43
4,120,538  10/1978 Headen ........................ 384/43

Primary Examiner—Thomas R. Hannon
Attorney, Agent, or Firm—Leydig, Voit & Mayer

[57] ABSTRACT

A shaft is supported to slide in a linear bearing which, in turn, is supported within a bore in a pillow block housing. To enable the bearing to self-align with a bearing in a paired pillow block housing, the bore of the housing is longitudinally crowned and permits the bearing to rock universally within a limited range while still maintaining rigidity and precise centerline accuracy.

4 Claims, 1 Drawing Sheet

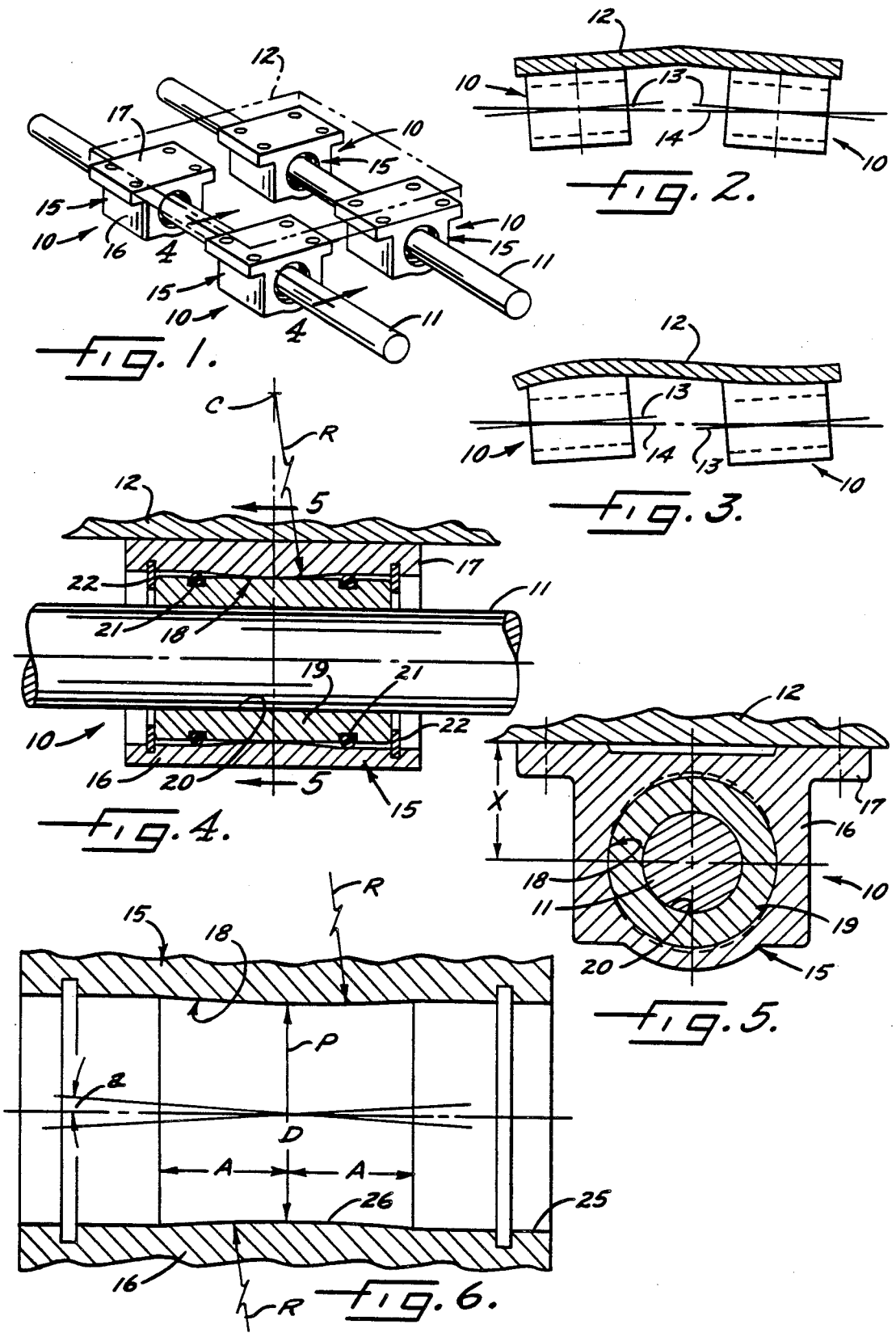

PILLOW BLOCK HOUSING FOR A SHAFT-SUPPORTING BEARING

BACKGROUND OF THE INVENTION

This invention relates generally to a bearing assembly and, more particularly, to a bearing assembly having a pillow block housing for supporting a linear bearing which, in turn supports a slidable shaft.

In many applications, the slidable shaft is guided by two bearings which are housed in two axially spaced pillow blocks. In order to enable free sliding of the shaft, it is essential that the centerlines of the two bearings be in precise alignment. Such precise alignment is difficult to attain, however, because of imprecision in the structure on which the pillow blocks are mounted or because of imprecise installation of the pillow blocks. While self-aligning pillow blocks exist, they are relatively complex in structure and, in some cases, the pillow blocks themselves are so imprecise that ball bearing bushings are necessary to compensate for the loose tolerances of the pillow blocks and maintain precise centerline accuracy.

SUMMARY OF THE INVENTION

The general aim of the present invention is to provide a new and improved pillow block housing which is self-aligning and which, at the same time, is of very simple construction and establishes precise and rigid centerline accuracy.

A more detailed object of the invention is to achieve the foregoing by providing a pillow block housing having a bore which is shaped to enable the bearing to rock universally within the housing through a limited range to permit self-alignment while still maintaining precision rigidity.

In still a more detailed sense, the invention resides in forming a spherical radius at the midportion of the pillow block bore in order to permit rocking of the bearing while still providing the solid rigidity necessary to support overhung loads.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical installation utilizing bearing assemblies having new and improved pillow block housings incorporating the unique features of the present invention.

FIGS. 2 and 3 are diagrammatic views which schematically illustrate on a greatly exaggerated scale two different conditions which can cause centerline misalignment of a pair of axially spaced bearing assemblies.

FIG. 4 is an enlarged fragmentary cross-section taken substantially along the line 4—4 of FIG. 1.

FIG. 5 is a fragmentary cross-section taken substantially along the line 5—5 of FIG. 4.

FIG. 6 is an enlarged fragmentary cross-section taken axially through the bore of the pillow block housing of FIG. 4.

DETAILED DESCRIPTION OF THE PREFERRED EMBODIMENT

For purposes of illustration, the invention has been shown in the drawings in conjunction with bearing assemblies 10 for linearly slidable shafts 11. In this instance, two parallel shafts have been illustrated and each is adapted to slide within a pair of axially spaced bearing assemblies. The bearing assemblies have been shown as being secured to the underside of a component 12 such as a machine tool carriage and support the carriage for movement along the shafts.

It is important that the carriage 12 be supported precisely and rigidly on the shafts 11 and to be able to move freely along the shafts with very low friction. In order to enable free sliding, it is necessary that the axes 13 (FIGS. 2 and 3) of the two bearing assemblies 10 for each shaft be in precise alignment and coincide precisely with the axis 14 of the shaft so as to prevent binding of the shaft. Precise alignment of the two axes 13, however, is difficult to achieve. For example, the carriage 12 may be bent slightly as shown in FIG. 2 thereby resulting in the axes 13 of the bearing assemblies 10 sloping in opposite directions relative to the axis 14 of the shaft 11. Or, the carriage may be torqued as shown in FIG. 3 and cause the axes 13 to slope in the same direction relative to the axis 14. Still a further misalignment condition which has not been illustrated involves the installation of one bearing assembly 10 at an angle relative to the other assembly such that the axis 13 of one assembly is inclined relative to the axis 14 of the shaft even though the axis of the other assembly might coincide with the shaft axis.

The present invention contemplates the provision of a bearing assembly 10 having a unique pillow block housing 15 which, while being simple, rigid and precise, is constructed so as to enable the axis 14 of the shaft to pivot relative to the geometric axis 13 of the overall bearing assembly and thereby enable the shaft to automatically compensate for any minor misalignment between two bearing assemblies. The pillow block housing 15 of the invention is particularly characterized by the fact that it provides self-alignment capability while holding an extremely close centerline tolerance.

More specifically, each pillow block housing 15 includes a body 16 and a mounting flange 17. A bore 18 of circular cross-section is formed longitudinally through the body 16. Housed in the bore 18 is a bearing or bushing 19 (FIG. 4) which forms part of the overall bearing assembly 10. The bushing is formed with a cylindrical bore 20 which is lined with an antifriction material to enable the shaft 11 to slide freely in that bore.

The outer surface of the bushing 19 is cylindrical and is formed with two axially spaced and circumferentially extending grooves which receive resiliently yieldable O-rings 21 (FIG. 4). The O-rings are compressed by the bore 18 of the pillow block housing 15. Two snap rings 22 fit into axially spaced annular grooves in the bore 18 and engage the ends of the bushing 19 to captivate the bushing axially.

In carrying out the invention, a portion of the bore 18 of the pillow block housing 15 is longitudinally crowned in order to enable the bushing 19 to rock universally through a limited distance and accommodate misalignment between two paired pillow block housings. Referring to FIG. 5, there is shown a radial plane P which cuts through the bore 18 substantially midway between the ends of the bushing 19. In the radial plane P, the bore 18 has a minimum diameter D which very closely approximates the outer diameter of the bushing 19. As the bore proceeds axially in opposite directions from the plane P, its diameter increases progressively and symmetrically for predetermined equal distances A.

The two end portions 25 of the bore are of conventional cylindrical shape.

While the bore 18 could be defined by two oppositely tapered frustums whose small ends meet at the radial plane P, it is highly preferred that the bore be arcuately crowned (i.e., formed on a large spherical radius R (FIG. 4) struck from a center C located in the plane P). Stated differently, the bore 18 is shaped such that every possible line extending longitudinally along the surface of the bore defines a convex arc 26 having a midpoint located at the plane P and having ends each spaced a distance A from such plane. The bore may be formed in this manner by a boring tool operated by a CNC machine tool.

By virtue of the crowned bore 18, the bushing 19 of the bearing assembly 10 may rock in the pillow block housing 15 in any direction necessary to enable the axis of the bushing to move into alignment with the axis of the bushing of a paired bearing assembly 10 and thereby accommodate misalignment between the nominal axes 13 of the two bearing assemblies themselves. Importantly, the self-alignment capability afforded by the crowned bore 18 does not sacrifice precision. In one specific example, the crowned portion of a bore with a diameter D of 1.25" has a total length 2A of 2.0" and allows the bushing to pivot in any direction through an angle a of ½ degree. This results in an angular displacement of the bushing and shaft through 0.0087" for each inch of length from the plane P. Because of the precision fit between the inner diameter of the bore 18 and the outer diameter of the bushing 19 at the midpoint plane P, the centerline accuracy X (FIG. 5) of the bearing assembly 10 is held to within a tolerance of plus/-minus 0.0010" as opposed to an industry standard of plus/minus 0.003".

From the foregoing, it will be apparent that the present invention brings to the art a new and improved pillow block housing 15 in which the specially shaped bore 18 allows universal rocking of the bushing 18 to accommodate misalignment. The resilient O-rings 21 dampen vibration and tend to keep the axis of the bushing coincident with the axis of the bore but yield as necessary to permit rocking of the bushing. Softer or harder O-rings may be used to control the lateral stiffness of the bearing assembly.

Since the bushing 19 is cylindrical and is not crowned, the same bushing may be used in the self-aligning pillow block housing 15 or in a standard precision housing. Also, the bearing 19 may be in the form of the plain bushing which has been shown or, as an alternative, a Thompson-type roller bearing may be used in the housing 15.

I claim:

1. The combination of, a shaft having a central longitudinal axis, a bearing for supporting said shaft, and a housing for supporting said bearing, said bearing being of circular cross-section and having a predetermined outer diameter, said bearing having an outer surface which is circumferentially continuous through 360 degrees around said axis, said housing having a bore which receives said bearing, said bore being of circular cross-section, being circumferentially continuous for 360 degrees around said axis and having, in a predetermined radial plane, a diameter which closely approximates the outer diameter of said bearing, the diameter of said bore increasing progressively and symmetrically as said bore proceeds axially a predetermined distance from each side of said plane whereby said bearing may rock within said bore to enable the axis of said shaft to assume a position which is inclined angularly relative to the axis of said bore.

2. The combination defined in claim 1 in which said bore is shaped such that every possible line extending longitudinally along the surface of said bore defines a convex arc having a midpoint located at said plane and having ends each located said predetermined distance from said plane.

3. The combination defined in claim 2 in which said plane is located substantially midway between the ends of said bearing.

4. The combination of, a shaft having a central longitudinal axis, a bearing for slidably supporting said shaft and having two ends, and a pillow block housing for supporting said bearing, said bearing being of circular cross-section and having a predetermined maximum outer diameter, said bearing having an outer surface which is circumferentially continuous through 360 degrees around said axis, said pillow block housing having a longitudinally extending bore which receives said bearing, said bore being of circular cross-section, being circumferentially continuous for 360 degrees around said axis and having, in a predetermined radial plane, a minimum diameter which closely approximates the outer diameter of said bearing, said plane being located substantially midway between the ends of the bearing, said bore being shaped such that every possible line extending longitudinally along the surface of the bore defines a convex arc having a midpoint located at said plane and having ends located equidistantly from opposite sides of said plane, the shape of said bore causing the diameter of said bore to increase progressively and symmetrically as said bore proceeds axially in opposite directions from said midpoint of said arc to said ends of said arc whereby said bearing may rock within said bore about said midpoint to enable the axis of the shaft to assume positions which are inclined at different angles relative to the axis of the bore.

* * * * *